July 18, 1939.  G. MATRAT  2,166,258
REVERSIBLE TOP FOR CAMERA STANDS
Filed Jan. 13, 1938
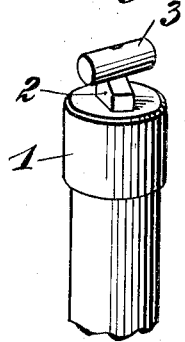
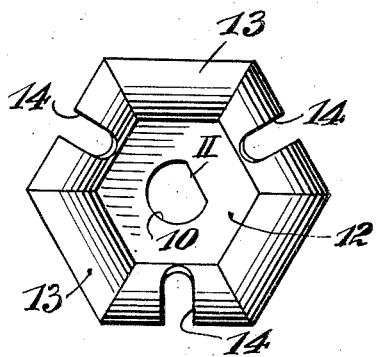
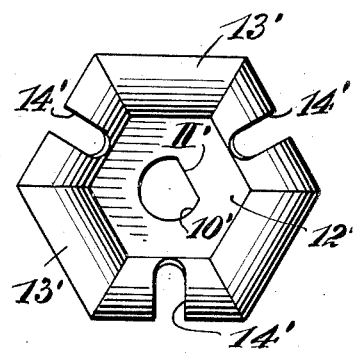
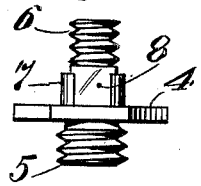
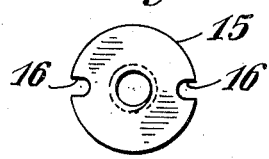
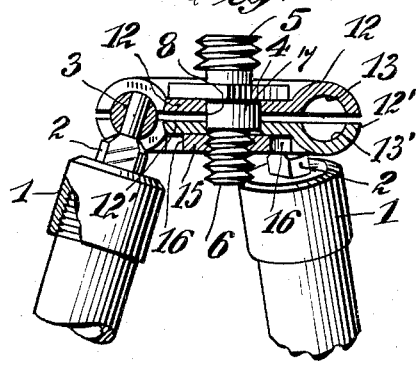
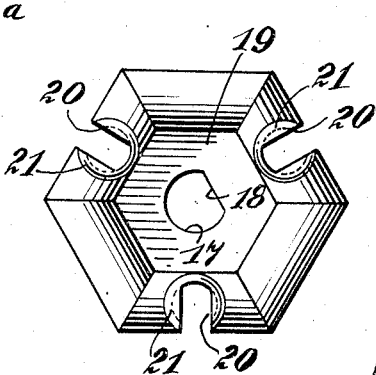
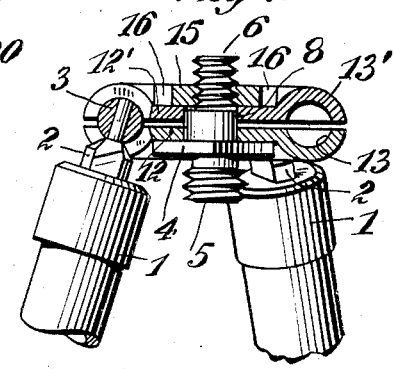
INVENTOR.
Gabriel Matrat
C. P. Goepel
BY his ATTORNEY.

Patented July 18, 1939

2,166,258

UNITED STATES PATENT OFFICE 2,166,258

REVERSIBLE TOP FOR CAMERA STANDS

Gabriel Matrat, Paris, France

Application January 13, 1938, Serial No. 184,855
In Luxemburg January 14, 1937

5 Claims. (Cl. 248—187)

The object of this invention is a reversible top for camera stands.

It is well-known that cameras are provided with an inner screw-thread to fit a screw thread integral with a top to which extensible legs are attached so as to be able to move to and fro. At the present time, two pitches are used, namely, the so-called "Kodak" pitch, and the "congress" pitch.

The reversible top for camera stands according to this invention, eliminates various disadvantages of earlier devices. The invention consists of two metal stamped plates matching with each other, and reversed in position, joined by a central member having two different kinds of known threads, one congress, one Kodak, and the plates holding either cylindrical or spherically shaped members by a clamping action brought about by the central member, so that when the parts are assembled with one thread uppermost, they can be used with one camera, and with another thread uppermost with a different camera. Or, the desired threads can be brought uppermost by simply moving the legs about 180°, and then fastening the parts together. Only one threaded end is intended to be used at one time, depending upon the threaded recess of the camera.

Among the advantages of the invention is that the adjusting is reduced to an exceedingly simple operation that can easily be carried out by the user.

The invention will be further described hereinafter, embodiments thereof shown in the drawing, and the invention will be finally pointed out in the claims.

In the accompanying drawing:

Figure 1 shows a perspective view of the top of a leg according to the invention, provided with a cylindrical spread portion;

Figures 2 and 3 show similarly two plates intended to be joined by the part shown in Figure 4 and held in position by the nut shown in Figure 5;

Figures 6 and 7 show the legs attached to the plates according to the invention when in use, the position shown in Figure 6, having a congress thread uppermost, and that shown in Figure 7 having a Kodak thread uppermost;

Figure 8 shows an alternative form of leg with a spherical portion; and

Figure 9 shows a plate provided with housings in the form of the spherical cups, adapted to the leg shown in Figure 8.

Similar characters of reference indicate corresponding parts throughout the various views.

Referring to the drawing, and more particularly to Figure 1, each leg component of the reversible top according to the invention has at its upper end a plug 1 adapted to pass over a supporting rod as known, with a T-shaped extension made up of a median central rod 2 and an upper cylindrical bar 3.

In Figures 2 and 3 are shown top views of two matching plates 13 and 13', each having hexagonal perimeters, radial cut-outs 14 and 14', in alternate sides, and enclosed flattened portions 12 and 12', with central openings 10 and 10' of circular shape with one side straight, as shown by II and II'. In radial section, the sides are semicircular, as shown in Figures 6 and 7. The cut-outs 14 and 14' are in three non-consecutive sides of each channel perimeter, perpendicular to the latter and in their median position.

The two plates 13 and 13' are placed in reverse order upon each other so that the two semicircular portions form in effect a complete circle, with a space in between the two plates. When thus disposed, the double threaded member shown in Figure 4 is used to join the plates together. This member has its parts preferably integral, and consists of a threaded end portion 6, corresponding to the known Kodak thread, and is thus adapted to cameras having that thread in their socket, and at the other end portion there is provided a threaded portion 5 corresponding to the known congress thread, and is thus adapted to cameras having that thread in their socket. Between the two end portions is a flange or washer member 4 and an insert member, the latter having the configuration of the opening 10 or 10', namely, circular in part as shown by 7 and straightsided in part as shown by 8. The depth of the insert member corresponds generally as seen in Figures 6 and 7, to the length made up of the two thicknesses of the plates at their flattened portions 12 and 12', and to the space therebetween. With the insert member thus disposed in the registering openings 10 and 10', a washer or nut 15 is applied having a screw threaded opening of a diameter corresponding to the threaded portion 6, as shown in full in Figure 5. This nut 15 has diametrical recesses 16, adapted to be engaged by a suitable tool.

In Figure 6, the flange 4 is uppermost and the congress pitch is uppermost. Thus, by holding flange 4 stationary and rotating the nut 15, the two plates are brought together to such a position as desired, depending upon the necessary holding or clamping qualities of the plates upon the cylindrical end 3 of the legs. Thus assembled, the cylindrical bars of the three legs are inserted between the plates, and the rods 2 are likewise inserted into the cut-outs 14 and 14'. The engagement of the cut-outs 14 and 14' with the squared off rods 2, prevents the legs from rotating.

The structure shown in Figure 6 has the congress thread 6 uppermost, and can be used with a congress threaded bore camera. Or, the parts can be dissembled and the Kodak thread 5 placed uppermost, in which case the washer 15 is lowermost as shown in Figure 7. Or, if the set-up of Figure 6 is desired to be used for a Kodak threaded bore camera, the legs can be swung about 180°, and thereby the Kodak thread 5 brought uppermost. The plates must, of course, be loosened in respect to the cylindrical bars 3 to permit this movement.

Instead of cylindrical bars 3, spherically shaped ends 3a, as shown in Figure 8, may be used. To accommodate these spherically shaped ends, the plates are provided with spherically shaped seats 21 along the cut-outs 20 of the plate shown in Figure 9, which is otherwise like the plate 13 or 13' having hexagonal perimeter sides, a flattened portion 19 and a centrally located opening 17 of circular shape, with a flattened side 18.

It will be seen that two metal stamped plates matching with each other, are reversed in position, and joined by a central member having two different kinds of known threads, one congress, one Kodak, and between the plates are held either cylindrical or spherically shaped members by a clamping action brought about by the plates acting upon the central member, and that when the parts are assembled with one thread uppermost, they can either be re-assembled to be used with a different camera, or the legs can be moved about 180° and then fastened again. Only one threaded end, either 5 or 6, is intended to be used at one time, depending upon the threaded recess of the camera.

The foregoing descriptions of various embodiments are not to be considered as forming integral parts of the invention, although they have been given by way of examples with respect to the general characteristics, the latter being amenable to many other types of embodiment.

The shapes and accessory arrangements of the various parts of the devices described, the dimensions, the constituent materials, in so far as they are suitable, the details and means of embodiment, may vary without departing from this invention, as defined by the appended claims.

I claim as new:

1. In a reversible top for camera stands, the combination of two matching plates, one reversed in position in respect to the other, each plate having a flattened portion with an opening therein and each plate having spaced radial cut-outs in its perimeter, and of substantially semicircular cross-sectional shape, a joining member having ends of different screw threads, one a congress and one a Kodak thread, having a flange, and a central portion of the configuration of the opening in the plates, and a nut having a threaded opening adapted to engage one of the threaded ends, the flange resting against one of the plates, and the nut resting against the other of the plates, and a plurality of supporting rods, each having a squared rod lockingly engaging the cut-outs of the plates and having a part extending therefrom engaged by the plates between the same, whereby when the joining member is in one position its thread is adapted to engage a threaded bore of corresponding kind, and when in another position its threaded end is adapted to engage a bore with a different thread.

2. A structure like claim 1, in which the part extending from the squared rod is cylindrical.

3. A structure like claim 1, in which the part extending from the squared rod is spherical, and the plates are provided with seats to conform to said spherical ends.

4. A structure like claim 1, in which the plates have hexagonal perimeters, and the cut-outs in alternate sides of the plates.

5. A structure like claim 1, in which the openings in the plates have a circular shape with a straightened side.

GABRIEL MATRAT.